United States Patent [19]

Paffoni et al.

[11] Patent Number: 4,523,953
[45] Date of Patent: Jun. 18, 1985

[54] PHOTOSTABLE YELLOW COMPOSITE PIGMENTS AND PROCESS FOR THEIR PREPARATION

[75] Inventors: Camillo Paffoni, Pogno; Filippo M. Carlini; Giorgio Bottaccio, both of Novara; Alberto Osti, Milan, all of Italy

[73] Assignee: Montedison S.p.A., Milan, Italy

[21] Appl. No.: 558,023

[22] Filed: Dec. 5, 1983

[30] Foreign Application Priority Data

Dec. 6, 1982 [IT] Italy .................. 24619 A/82

[51] Int. Cl.³ .................. C08L 1/08; E09D 11/00
[52] U.S. Cl. .................. 106/23; 106/193 R; 106/289; 106/300; 524/190; 534/739
[58] Field of Search .......... 106/123, 193, 289, 300, 106/23; 524/190; 260/193

[56] References Cited

U.S. PATENT DOCUMENTS

| | | | |
|---|---|---|---|
| 1,086,155 | 2/1914 | Geldermann et al. | 260/193 |
| 1,788,300 | 1/1931 | Huismann et al. | 260/193 |
| 3,520,869 | 7/1970 | Stocker et al. | 106/23 |
| 4,084,983 | 4/1978 | Bernhardt et al. | 106/289 |

Primary Examiner—Theodore Morris
Attorney, Agent, or Firm—Morgan, Finnegan, Pine, Foley & Lee

[57] ABSTRACT

There are described organic-inorganic ternary composite pigments consisting of 70%–90% by weight of an inorganic binary titanium dioxide/aluminum hydrate component and, from 10% to 30% by weight, of a co-precipitated organic component consisting of an organic dye, containing in its structure at least one carboxylic and/or sulphonic acid function, having the formula:

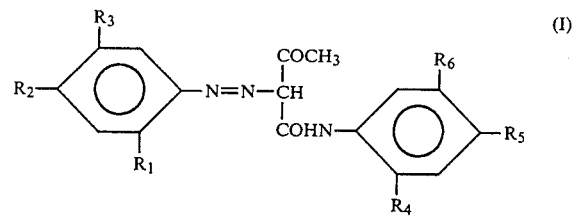

wherein $R_1$ is selected from the group consisting of $NO_2$ —$SO_3H$ and —COOH; $R_2$ is selected from the group consisting of $NO_2$, —$SO_3H$, alkyl and alkoxyl; $R_3$ is selected from the group consisting of H, halogen and alkyl; $R_4$ and $R_5$ are each selected from the group consisting of H, halogen, alkyl and alkoxyl; $R_6$ is selected from the group consisting of H, halogen and alkoxyl; and wherein the —COOH and/or —$SO_3H$ group of dye (I) is salified with metal cations.

The pigments are obtained by co-precipitation acidifying an aqueous solution and/or dispersion of acid dye (I) in sodium aluminate, in the presence of $TiO_2$, maintained at 40°–80° C. and at pH=9.5–10.5, by then treating it with any aqueous solution of an alkaline-earth (Ca, Ma, Al, Ba, Sr) salt or of Mn or Zn.

16 Claims, No Drawings

PHOTOSTABLE YELLOW COMPOSITE PIGMENTS AND PROCESS FOR THEIR PREPARATION

SUMMARY OF THE INVENTION

The present invention concerns a new class of composite pigments and the corresponding process for their preparation.

Specifically, the present invention relates to a new class of organic-inorganic composite pigments, to their preparation and use in dying products, air-drying and oven-drying enamels, in the pigmentation of plastic materials, inks, in the be-printing of fabrics, etc., by means of known conventional techniques.

More particularly, the present invention is directed to a class of ternary composite pigments consisting of a binary inorganic constituents based on Ti-dioxide and Al-oxyhydrate, possessing high physical pigmentary characteristics, and of an organic or chromophoric dying constituent selected from the group consisting of azoic dyes containing in their structure at least one carboxylic acid function (—COOH) and/or a sulphonic (—SO$_3$H) acid function, substantially salified, which by itself may even not possess pigmentary characteristics, intimately associated with the former by co-precipitation.

The bond between the organic and inorganic constituents turns out to be so strong and stable as to ensure to the pigmentary complex high applicative characteristics.

In the description that follows hereunder, the term "composite pigment" shall be understood to refer to a pigmentary material consisting of an association of a dyeing organic constituent with a solid inorganic binary substrate or carrier, based on a Ti-dioxide and Al-oxyhydrates, obtained according to a co-precipitation method that will be more clearly defined further on.

The above-described association of the particular organic dye with the inorganic binary support or carrier gives place to a ternary composition endowed with a high photostability and high pigmentary characteristics suited for different applications.

The present invention, moreover, is directed towards providing the corresponding method of preparation of such ternary composition and to the application of the organic-inorganic compounds obtained in the pigmentary field.

The pigments of this invention provide industrial products offering a wide range of applicational possibilities in the pigmentary field. The pigments of this invention are insoluble in water and in the usual organic solvents. Besides possessing a good dyeing power; they have a high photostability, an excellent thermo or heat stability, a fastness to solvents, bases and acids, a good resistance to migration in plastics, to overpainting with stoving enamel. Lastly, the pigments of this invention may be obtained in types of various degrees of covering power.

These pigments find, thus, an elective use in varnishing products, in air-drying enamels and stoving-enamels and in the pigmentation of plastic materials in which there is required a high photostability. The pigments are also useful in the medium and light tones associated with a heat stability and fastness to solvents.

BACKGROUND OF THE PRIOR ART

Prior to the present invention the prior art has been interested in obtaining pigments endowed with dulling properties, of photostability and in general with pigmentary characteristics comparable with those of conventional inorganic pigments such as chromium yellows, cadmium yellows, the preparation and use of which always meet with increasingly severe limitations because of their toxicity.

In an attempt to achieve the above-mentioned objectives, the prior art has suggested a series of solutions based on the attribution and/or enhancing of the pigmentary properties in organic dyes of an acid type, by means of lacquering and supporting technologies that may lead to complexes of a pigmentary nature consisting of an organic and an inorganic portion.

In this connection it is known that the acid dyes are compounds that contain in the molecule acid groups (COOH, SO$_3$H) which impart to the products a solubility in water or in alkaline media, and are mainly used in the dyeing of either natural or synthetic polyamidic fibres. It is likewise known that some of these compounds may form insoluble compounds ('toners'), lacquers, in combination with alkaline-earth metal salts (Ca, Ba, Mg, Sr, Al) and/or of another nature (Mn, Zn).

These latter, like most part of the organical pigments, do not possess the dulling properties (hiding power) or traditional inorganic pigments (chromium yellows, cadmium yellows). On the contrary, in the dyeing stage of the manufactured article, they are mechanically associated with inorganic fillers of various natures. Depending on the type of application, such charges may consist of compounds (for instance barites) of modest hiding power or compounds (for instance TiO$_2$) of high hiding power.

Nevertheless, in the case of fillers with a high hiding power (TiO$_2$), there is required the use of highly colored compounds and/or in a great quantity in order to achieve high intensities of coloring, which consequently involves considerable economical burdens.

Also, the prior art reports the association of the organic pigment with inorganic fillers, carried out in the stage of the sythesis of the pigment itself. In fact, there are known products of the lacquer type, which are prepared in the presence of inorganic supports amongst which the most common are basic Al compounds (basic sulphate-Pigment White 24) or mixtures of BaSO$_4$ and aluminum hydrate (Pigment White 23).

According to above said technique, the precipitation of the lacquers occurs normally in two stages. For example, at the start one precipitates, under controlled pH- and temperature conditions, from Al sulphate the basic aluminim sulphate. Then, in the stated order of addition, there are added the solution of the dye and the solution containing a metered quantity of BaCl$_2$ in such a way as to cause the simultaneous precipitation of the insoluble salt of the organic dye and of the Barium sulphate on the Al(OH)$_3$ substrate. This technique allows, substantially, the preparation 'in situ' (on the spot) of the inorganic substrate and allows one to obtain a dye-receptive surface but with poor hiding power.

According to other known processes, in the synthesis stage, there are used inorganic substrates of high hiding powers (TiO$_2$). In fact, it is known that acid dyes may be precipitated under controlled pH conditions (pH=2-5) in the presence of TiO$_2$ and other organic matrixes.

In the above-referred to prior art approaches, the aforementioned prior art provides no appreciable advantages in comparison with the mechanical mixtures of the single components.

According to another prior art technique, the acid dye is precipitated, in the form of Al lacquer, Cr lacquer, etc., in the presence of lignisulphonates.

Common characteristics of these co-precipitation processes is that of obtaining, in any, the formation of organic-inorganic compositions, substantially consisting, on a binary base, of a lacquer of an organic dye supported by precipitation on an inorganic matrix.

OBJECTS OF THE INVENTION

An object of the present invention is that of providing organic-inorganic products on a ternary base possessing hiding powers, coloring powers and a photostability (fastness to light), and pigmentary characteristics enabling it to substitute the colored inorganic pigments (chromium yellow, cadmium yellow) which are objectable from the point of view of environmental safety.

Still another object of this invention is that of providing organic-inorganic products which on the whole will display applicative pigmentary properties superior to the mechanical mixtures of the single components and superior to those of the mechanical mixtures that are obtainable with the best organic pigments being used at present.

A further object of this invention is that of providing a process that be suited for preparing the novel pigments of this invention.

GENERAL DESCRIPTION OF THE INVENTION

All these and other objects, more which will appear more clearly to the skilled in the art in the following description, are achieved, according to the invention, by the organic-inorganic ternary composite pigments consisting of from 70% to 90% by weight of an inorganic binary component of titanium dioxide and aluminum hydrate and, of from 10% to 30% by weight of a co-precipitated organic component, consisting of an organic azoic dye, containing in its structure at least one carboxylic (COOH) and/or sulphonic (—$SO_3H$) acid function, of following formula (I);

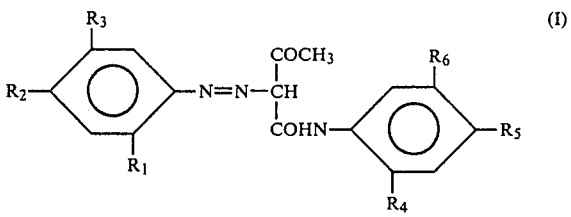

wherein $R_1$ is selected from the group consisting of $NO_2$ —$SO_3H$ and —COOH; $R_2$ is selected from the group consisting of $NO_2$, —$SO_3H$, alkyl and alkoxyl; $R_3$ is selected from the group consisting of H, halogen and alkyl; $R_4$ and $R_5$ are each selected from the group consisting of H, halogen, alkyl and alkoxyl; $R_6$ is selected from the group consisting of H, halogen and alkoxyl; and wherein the —COOH and/or —$SO_3H$ group of dye (I) is salified with metal cations.

The composite pigments on a ternary base provided by the present invention, preferably are characterized by a content in azoic organic dye of formula (I) containing at least one salified —COOH or $SO_3H$ group, in a proportion of between 10% and 25% by weight, by a weight ratio $TiO_2$/salified organic dye comprised between 1:1 and 5:1, but preferably comprised between 2:1 and 4:1, and by a weight rato $Al(OH)_3$/salified organic dye $\geq 1$.

The organic dyes of formula (I) are present in the ternary pigmentary composition in the form of salts of metal cations, preferably alkaline-earth metals, chosen from amongst Ca, Mg, Al, Ba, Sr, or of cations selected from the group consisting of Mn and Zn.

The composite pigments of the present invention endowed with the above specified particular pigmentary characteristics are obtained operating according to a co-precipitation process that forms another part of the present invention.

Briefly summing up, the preparation process consists in carrying out, under controlled pH conditions, that are substantially alkaline, the co-precipitation of the acid organic dye of formula (I) with aluminum hydrate, by means of an acidification of an aqueous solution and/or solution/dispersion of the acid organic dye in sodium aluminate, in the presence of titanium dioxide, at about 40°–80° C., and in the successive lacquering by treatment with an aqueous solution of a salt of an alkaline earth metal (Ca, Mg, Al, Ba, Sr) or of Mn or Zn.

Thus, the process is characterized in that a solution and/or suspension of the acid organic dye in an aqueous medium with a pH > 10.5 by the presence of $NaAlO_2$, after the introduction of the $TiO_2$, is gradually brought up to a pH value comprised between 9.5 adn 10.5 by the addition of a mineral acid, and then, after the introduction of a metal salt in quantities substantially greater than the stoichiometric quantity with respect to the acid dye, is brought up to a pH value comprised between 6.5 and and 7.5, at a temperature comprised between about 40° C. and 80° C., within a period of time comprised between 0.5 and about 2 hours, and by finally separating the product.

The raw materials of an inorganic nature used in this process are: titanium dioxide or titanium dioxide based pigments, and sodium aluminate.

As far as the $TiO_2$ is concerned, there may be used the commercial types obtained by a via sulphate or via chloride process which provide surface treatments suited for conferring upon them specific properties of photostability (light fastness), dispersibility, etc. There may also be used types of $TiO_2$ rutile, not postreated and suitably ground. The use of $TiO_2$ anatase or of calcination intermediates with a rutile-anatase structure are not excluded.

Lastly, there may be used $TiO_2$ based colored inorganic pigments, such as e.g., C.I. Pigment Yellow 53 (Ti-Ni-Sb)$O_2$ and C.I. Pigment Yellow 118 (Ti-Ni-Sb-Cr)$O_2$.

As far as the sodium aluminate is concerned, as a rule there are used aqueous solutions with a titre of, for instance, 500–650 g/lt of $NaAlO_2$.

The dyes of formula (I), as hereinabove defined, are particularly suited for being used in the preparation process of ternary composite pigments of the present invention which contain in their molecule at least one —COOH or —$SO_3H$ group. Such dyes are susceptible to forming lacquers that are substantially insoluble with metals, preferably alkaline-earth (Ca, Ba, Mg, Sr, Al) metals, or with Mn or Zn; and, moreover, they show a scarce solubility in water and a good solubility in an alkaline medium from which latter they are precipitable by acidification to a pH $\geq 7$. In addition, such dyes possess high molar extinction coefficients so that it is possible to obtain products with high tintorial (dyeing) properties, also operating with dye levels of the order of 10% by weight on the finished product.

The dyes of formula (I) have already been described in the technical literature and/or are available on the market. They are preparable according to the known methods of the Prior Art.

The concentration of dye, in the aqueous solution or dispersion, in sodium aluminate may vary within a wide range, depending on its solubility. Just to give an orienting idea, there may be practically used concentrations comprised between about 5 and 30 g/lt.

The quantity of $NaAlO_2$ depends on the desired type of pigmentary composition (degree of transparency).

The $NaAlO_2$ may optionally be used associated with minor quantities of NaOH.

The dissolution or dispersion of the dye is carried out at a temperature comprised between about 40° C. and about 80° C., but preferably comprised between 40° and 60° C., that is, within the same temperature range that will have to be observed in the successive co-precipitation phase.

The addition of $TiO_2$, in its chosen structure, is preferably carried out in the form of an aqueous paste prepared separately. Or else, according to a convenient execution of the invention, there may be directly used the filtration cake of the $TiO_2$ just as it is obtained at the production stage, before its being dried.

The $TiO_2$, at least, may be added also directly to the solution or dispersion of the dye in the form of a powder. The same may be said for the $TiO_2$ based pigments.

The phase of co-precipitation of the aqueous solution or dispersion of the dye in the presence of sodium aluminate and of possible NaOH, is achieved by using mineral acids, preferably HCl.

The concentration of the acid is not critical; operational values, in the case of the use of HCl, are comprised between 50 and 200 g/lt or equivalents; the co-precipitation phase will thus be followed in a more effective way.

The first co-precipitation phase, under operational process conditions, requires times comprised between about 0.5 and 2 hours, but preferably comprised between about 1 and 1.5 hours.

At the end of the first co-precipitation phase, to the aqueous slurry showing a pH of about 10, there is added the solution of the chosen metal, preferably Ca, Ba, Mg, Al, Sr; also Mn and Zn salts are compatible. This addition is carried out within a time of about 30 minutes.

The metal is additioned in the form of a soluble salt, in quantities at least stoichiometric with respect to the quantity necessary for co-precipitating the corresponding salt, of the acid dye used, in the form of an insoluble lacquer. In order to ensure said effect, there are used quantities that are from 2 to 4 times greater.

After the introduction of the solution of the metal salt, the dye precipitates in a salified form together with the Al hydrate in a substantially alkaline medium. This process allows to obtain the formation of colored coating of the $TiO_2$ and the formation of a colored microcrystalline $Al(OH)_3$.

The combined effect of the above-described conditions leads to the situation in which the final pigmentary product assumes chemical-physical and applicational characteristics of such particular interest as to make these new pigments very similar to those of the chromium yellow, cadmium yellow, etc., type.

At the end of the addition of the salt and keeping the obtained suspension, within the same temperature range at which was carried out the co-precipitation phase, under constant stirring, the pH value was gradually brought into the pH value range of 8.5 to 9 first, and then to a pH value comprised between 6.5 and 7.5 by the addition of a mineral acid (HCl).

The final neutralization phase is preferably conducted in a total time comprised between 45 and 90 minutes, but at any rate until reaching the completion and stabilization of the coprecipitated suspension. Generally, the duration of the process is comprised between about 2 and 4 hours.

Thereupon there follow the operations of separating, drying, etc., conducted according to substantially conventional methods.

For instance, the product is filtered, washed in order to remove the soluble salts., and finally dried.

The drying is conducted at temperatures comprised between 50° and about 100° C., but preferably comprised between about 70° and 80° C.

This pigment thus obtained is substantially already in the physical conditions suited for its use. Nonetheless, with this process are compatible any of the conventional post-treatment operations.

For instance, the product may be ground, preferably in micronizing mills or in air-jet mills. This type of grinding allows to obtain products that are easily dispersible in oily vehicles, plastic materials, inks, etc., and that will offer improved applicational performances such, for example, photostability (light fastness), dyeing power, hiding power, brightness of the film of paint or ink.

The concentration of dye in the pigment as well as the ponderal ratio $TiO_2$/dye, depend on the nature of the dye and on the pigmentary characteristics that one wishes to achieve.

Thus, for instance, using dyes that display high tintorial properties, the concentration in dye may vary from 10% to 20% by weight, while the ponderal ratio $TiO_2$/dye may reach values comprised between 1 and 5. In this case the pigments are characterized in that they display high hiding power and adequate coloring powers.

The remaining inorganic part consists of aluminum hydrate oxide. The ponderal ratio $Al(OH)_3$/dye is, at any rate $\geq 1$ and obviously depends on the ponderal ratio $TiO_2$/dye.

The diffractometric analyses of the products evidence clearly, besides the $TiO_2$ rutile and/or $TiO_2$ anatase, the presence of $\beta$-$Al(OH)_3$ and of the microcrystalline ratio concerning the dye, in the form of a Ca, Mg, Al, Ba, Sr laquer, extremely dispersed.

The products object of the present invention have a specific surface area varying from 20 to 100 $m^2/g$, but preferably comprised between 40 and about 60 $m^2/g$. Under the morphological profile said products consist of two types of elementary particles; the $TiO_2$ particles covered by a coating of Al hydrate oxide and/or of a dye, and of those of Al hydrate oxide in which the salified dye is dispersed.

The pigments obtained according to the present invention have a composition that varies within a wide range, depending on the nature, quantity of the dye, of the inorganic substrate ($TiO_2$ and $Al(OH)_3$), on the granulometry, on the specific surface etc.

The obtained pigments offer, moreover, the advantage of being constituted by an inorganic component or substrate, of low cost and suited for imparting to said pigments excellent pigmkentary characteristics, that is stably associated by co-precipitation with an organic dye developing a high dyeing power and ensuring pure tones.

This advantage may be even better appreciated when one considers that the organic dyes used according to this invention, as already indicated, may also not possess by themselves any pigmentary characteristic which, on the contrary, is achieved in the composite pigments of the present invention.

This allows to improve in more than one application, organic dyes, extending their use with success and allowing their economical use for pigmentary applications of a high industrial interest.

Under this latter aspect, the present invention represents a considerable contribution to the solution of the problem represented by the high toxicity and/or high degree of pollution connected with the use of the inorganic pigments of large use and at present objectionable under these points of view, as, for instance, the chromium and cadmium based pigments.

The mechanical and/or thermal (heat) treatments and/or treatments with solvents, adopted in the traditional techniques for the use of the pigments in the various applicational fields, do not substantially modify the granulometry and, thus, the pigmentary characteristics of the products obtains according to the present invention.

Last, but not least, the presence, in the form of finely and homogeneously distributed particles in the organic-inorganic system, of hydrated alumina, exalts in the same its known improving characteristics of the dispersibility and flame retarding (inhibiting) capacity in general imparted to the pigments when it is conventionally used as a charge, "filler" or "extender", associated with a low cost, without influencing the brightness of the tones and the coloring power.

SPECIFIC DESCRIPTION OF THE INVENTION

The invention will now be described in more detail by means of the following examples which are given, however, for purely illustrative and not limiting purposes.

The parts and percentages, etc., when not otherwise specified, shall be intended as parts and percentages by weight.

EXAMPLE 1

Into a 3 liter beaker, fitted with a mechanical stirrer, under vigorous stirring, there were introduced in 1000 ml of water, 15 grams of dye, having the formula:

C.I. Yellow 62

$$HO_3S-\underset{NO_2}{\underset{|}{\bigcirc}}-N=N-\underset{COHN-\bigcirc}{\overset{COCH_3}{\underset{|}{CH}}}-\underset{CH_3}{\bigcirc}$$

The suspension was then heated up to a temperature comprised between 50° and 60° C., after which there were added 30 ml of NaOH having a concentration of 80 g/lt. and successively there were added 30 grams of NaAlO$_2$ (corresponding to 50 ml of a solution with a concentration of 600 g/lt).

The pH attained the value of 11.2 and there was observed an uncomplete solution of the dye. Thereupon was added a TiO$_2$ rutile dispersion consisting of 40 g of TiO$_2$ in 200 ml of water.

The slurry was kept until stirring for 30 minutes, after which there was started a slow, gradual acidification with HCl in a 50 g/lt concentration. Once there was attained in 30 minutes a 10.5 pH, at a temperature comprised between 50° C. and 55° C., there were added to the mixture 9 grams of CaCl$_2$ dissolved in 60 ml of water in a stretch of time of 10 minutes.

After 20 minutes, the slow and gradual acidification with HCl was resumed and carried on until reaching a pH of 9.5 and then, in 30 minutes, until attaining a pH of 7.

Thereupon the pH was allowed to stabilize itself and, after 60 minutes, still maintaining the temperature at between 50° and 55° C., it was filtered.

The mixture was thereupon washed with deionized water in order to remove the soluble salts, whereafter the filtration cake was dried at 80° C. and ground in an "ALPINE" model CONTRAPLEX 63 C" apparatus, thereby obtaining 80 grams of a yellow powder.

The elementary analysis of the product obtained evidenced a carbon content corresponding to 18.5% of organic dye.

The diffractometric analysis of the pigment evidenced the presence of TiO$_2$ rutile, β-alumina and a microcrystalline dye in the form of a lacquer intimately mixed together with the alumina.

The specific surface of the product amounted to 35 m$^2$/gram, determined according to the SORPTOMETER method.

EXAMPLE 2

Operating as described in Example 1, except for changing the quantity of varying the dye to 20 grams, maintaining the 30 g of.NaAlO$_2$ and the 40 grams of TiO$_2$.

There were obtained 85 g of a yellow pigment with a coloring power decidedly superior to that of Example 1, associated with a good hiding power and good general characteristics.

EXAMPLE 3

Operating in the same way as described in Example 1, there was only reduced to 30 g the quantity of TiO$_2$ and there were obtained 70 g of a yellow pigment with a coloring power superior to that of Example 1, but with a hiding power inferior to that of Example 1.

EXAMPLES 4–12

Operating as described in Example 1 and using different dyes, the following pigments were obtained:

| Ex. | Dye | Lacquering metal | Tone of pigment |
|---|---|---|---|
| 4 | 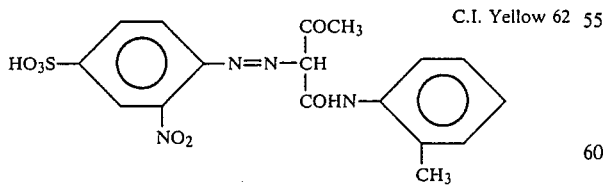 | Ca | greenish yellow |

-continued

| Ex. | Dye | Lacquering metal | Tone of pigment |
|---|---|---|---|
| 5 | SO₃H, NO₂ substituted phenyl–N=N–CH(COCH₃)(COHN–xylyl(CH₃)₂) | Ca | Yellow |
| 6 | SO₃H, NO₂ substituted phenyl–N=N–CH(COCH₃)(COHN–chlorophenyl) | Ca | greenish Yellow |
| 7 | SO₃H, NO₂ substituted phenyl–N=N–CH(COCH₃)(COHN–C₆H₄–Cl) | Ca | greenish Yellow |
| 8 | SO₃H, NO₂ substituted phenyl–N=N–CH(COCH₃)(COHN–C₆H₄–OCH₃) | Ca | Yellow |
| 9 | SO₃H, NO₂ substituted phenyl–N=N–CH(COCH₃)(COHN–C₆H₂(OCH₃)₂Cl) | Ca | Yellow |
| 10 | Cl, CH₃, SO₃H substituted phenyl–N=N–CH(COCH₃)(COHN–C₆H₂(OCH₃)₂Cl) | Ca | Yellow |
| 11 | CH₃, COCH substituted phenyl–N=N–CH(COCH₃)(COHN–C₆H₂(OCH₃)₂Cl) | Al | Yellow |
| 12 | NO₂, SO₃H substituted phenyl–N=N–CH(COCH₃)(COHN–xylyl(CH₃)₂) | Ca | Yellow |

EXAMPLE 13

Application in a vehicle for rotogravure. To 1.5 grams of pigment obtained according to Example 1, there were added:

22.5 g of a ground vehicle consisting of a phenolic resin suitably prepared in xylol, in a to weight ratio of 30:70.

The formulated product was ground in a two-arms planetary flanning mill of the Red-Devil Model 5400 type. Thereby was obtained a fluid yellow ink which was spread onto a cardboard provided with a series of black bands for evaluating the ink's hiding power by means of 6μ spreading bars and of 24μ spreading bars.

In this way were evaluated the tone, coloring power and the hiding power of the pigment, which proved to be good as it showed high fastness characteristics.

EXAMPLE 14

Application in polyvinylchloride.

0.3 grams of the pigment obtained in Example 1 were dispersed in 70 g of polyvinylchloride powder Syncron 548 FM (Montedison factory mark) with:

30 grams of dioctylphthalate as a plasticizer;
0.2 grams of U.V. stabilizer;
0.2 grams of thermal stabilizer (organometal Sn salts).

The mix was kneaded in a bicylindrical mill for 4 min. at 150° C. Thereby were obtained yellow colored dull sheets with good general fastness characteristics.

EXAMPLE 15

Applicative example for stoving enamel.

5 g of the pigment obtained according to Example 1, were dispersed in 95 g of vehicle for stoving enamel, having the following formulation:

59 parts of xylene,
22 parts of alkyd resin,
19 parts of melaminic resin, which were ground for 60 minutes in a Red-Devil Mod. 5400 mixing mill.

Thereby there was obtained an enamel with a good fluidity (flowability) which was spread with a 75μ bar on cardboards provided with black bands for the evaluation of the hiding power.

The spreadings were then baked in an over at 125° C. for 30 minutes. There was obtained in this way a shining covering enamel of a yellow tinge, showing a good fastness and in particular an excellent resistance to heat and to overpainting.

What is claimed is:

1. Composite ternary organic-inorganic pigments consisting of 70 to 90% by weight of a binary inorganic component of titanium dioxide and aluminum hydrate and, 10% to 30% by weight of an organic co-precipitated component consisting of an organic azoic dye containing in its structure at least one carboxylic (—COOH) and/or sulphonic (—SO₃H) acid function, of the formula:

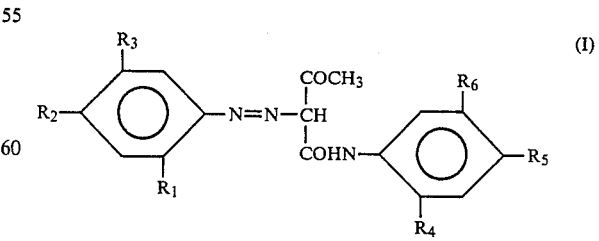

(I)

wherein $R_1$ is selected from the group consisting of $NO_2$ —$SO_3H$ and —COOH; $R_2$ is selected from the group consisting of $NO_2$, —$SO_3H$, alkyl and alkoxyl; $R_3$ is selected from the group consisting of H, halogen and alkyl; $R_4$ and $R_5$ are each selected from the group consisting of H, halogen, alkyl and alkoxyl; $R_6$ is selected from the group consisting of H, halogen and alkoxyl, and wherein the —COOH and/or —SO$_3$H group of dye (I) is salified with metal cations.

2. Composite pigments according to claim 1, characterized in that the salified azoic dye is present in the pigment in quantities ranging from 10% to 25% by weight ratio, with respect to the titanium dioxide, comprised between 1:1 and 1:5 but preferably comprised betwen 1:2 and 1:4, and with a by weight ratio with respect to the aluminum hydrate, of maximum 1.

3. Composite pigments according to 1 and 2 characterized in that the metals of the cations with which the carboxylic and/or the sulphonic group of the dye are salified, are selected from the groups consisting of alkaline earth metals, Mn and Zn.

4. Composite ternary pigments according to claim 1, characterized in that the inorganic binary component consists of aluminum hydrate and titanium dioxide selected from the groups consisting of rutile TiO$_2$, anatase TiO$_2$ and rutile anatase TiO$_2$.

5. Composite ternary pigments according to claim 4, characterized in that as a TiO$_2$ source there are used inorganic colored pigments based on TiO$_2$.

6. Composite ternary pigments according to claim 1, characterized in that they have a specific surface comprised between about 20 and 100 m$^2$/g and preferably comprised between 40 and 60 m$^2$/g.

7. Process for the preparation of composite ternary pigments as defined in claim 1 characterized in that an organic azoic dye of formula (I), as defined in claim 1, is made to co-precipitate by acidification, wthin a time interval of between about 2 and 4 hours, starting from one of its aqueous solutions and/or dispersions with sodium aluminate, under controlled pH conditions comprised between 9.5 and 10.5, in the presence of titanium dioxide at a temperature comprised between about 40° and about 80° C., by then treating said dye with an aqueous solution of a salt of a metal selected from the group consisting of alkaline earth metal Mn and Zn, brought down to a pH value comprised between 6.6 and 7.5 and then separated.

8. Process according to claim 7, characterized in that a solution and/or suspension of the organic said dye (I) in an aqueous medium having a pH > 10.5 by the presence of NaAlO$_2$, after the introduction of the TiO$_2$, is gradually brought up in an interval of time comprised between 0.5 and about 2 hours, to a pH comprised between 9.5 adn 10.5 and then, after the introduction of a salt of a metal selected from the group consisting of alkaline-earth metals and Mn and Zn, in quantities substantially superior to the stoichiometric quantity with respect to the acid dye, is brought down to a pH comprised between 6.5 and 7.5, by the addition of a mineral acid at a temperature comprised between about 40° and 80° C.

9. Process according to claim 7 or 8, characterized in that the titanium dioxide is selected from the group consisting of TiO$_2$ based colored pigments.

10. Process according to claim 7 or 8, characterized in that the sodium aluminate is used in association with minor quantities of sodium hydrate.

11. Process according to claim 7 or 8, characterized in that the co-precipitation temperature is preferably comprised between about 40° and 60° C.

12. Process according to claim 7 or 8, characterized in that the co-precipitation of the organic dye in aqueous soution and/or dispersion with sodium aluminate, is carried using HCl as a mineral acid.

13. Process according to claim 7 or 8, characterized in that the alkaline earth metal salt is selected from the group consisting of Ca, Mg, Al, Ba and Sr salts.

14. Process according to claim 7 or 8 characterized in that the alkaline earth metal salt or Mn or Zn is added in at least stoichiometric quantities with respect to the acid dye used, and preferably on the basis of a quantity 2 to 4 times greater.

15. A process for the coloring of plastic materials characterized in that a composite ternary pigment according to claim 1 is used.

16. A process for preparing a lacquer, stoving and air dried enamels, inka or pastes for the beprinting of textiles characterized in that a composite ternary pigment according to claim 1 is used.

* * * * *

UNITED STATES PATENT AND TRADEMARK OFFICE
CERTIFICATE OF CORRECTION

PATENT NO. : 4,523,953
DATED : June 18, 1985
INVENTOR(S) : Paffoni et al

It is certified that error appears in the above-identified patent and that said Letters Patent is hereby corrected as shown below:

Column 2, line 44 "sythesis" should read --synthesis--.

Column 4, line 30 "adn" should read --and--.

Column 4, line 35, second "and" should be deleted.

Column 12, line 7, "adn" should read --and--.

Column 12, line 26 "soution" should read --solution--.

Column 12, line 40, "inka" should read --inks--.

Signed and Sealed this

Twenty-fifth Day of March 1986

[SEAL]

Attest:

DONALD J. QUIGG

Attesting Officer

Commissioner of Patents and Trademarks